United States Patent [19]

Neu

[11] 4,089,563
[45] May 16, 1978

[54] APPARATUS FOR PNEUMATIC CONVEYANCE OF PULVERULENT OR GRANULAR MATERIALS

[75] Inventor: Francis Neu, Villeneuve-d'Ascq, France

[73] Assignee: Societe Anonyme des Etablissements Neu, Lille, France

[21] Appl. No.: 795,771

[22] Filed: May 11, 1977

[51] Int. Cl.² .............................................. B65B 53/66
[52] U.S. Cl. ...................................... 302/35; 302/42; 302/53
[58] Field of Search ....................... 302/29, 35, 42, 45, 302/47, 53, 66

[56] References Cited

U.S. PATENT DOCUMENTS

| 2,919,159 | 12/1959 | Lacroix | 302/53 |
| 3,001,829 | 9/1961 | De Saint-Martin | 302/53 |
| 3,365,242 | 1/1968 | Marchetti | 302/35 |

FOREIGN PATENT DOCUMENTS

| 1,058,639 | 3/1954 | France | 302/42 |
| 1,293,650 | 4/1962 | France | 302/42 |

Primary Examiner—Evon C. Blunk
Assistant Examiner—Jeffrey V. Nase
Attorney, Agent, or Firm—Gordon W. Hueschen

[57] ABSTRACT

An apparatus for the pneumatic conveyance of pulverulent or granular material, has a reservoir for the material, a fluidization barrier in the reservoir, an outlet for material flowing from above the barrier in the reservoir, an inlet conduit for fluidization gas opening below the barrier, a conveyor conduit connected to the outlet, an inlet conduit for pressurized conveying gas opening into the conveyor conduit, a first valve in the inlet conduit for fluidization gas, a second valve in the inlet conduit for conveying gas and control means for the said first and second valves arranged to control both the valves in dependence upon pressure in the conveyor conduit and to maintain said second valve partly open when said first valve is open but to open said second valve beyond a predetermined opening degree when said first valve is completely closed.

7 Claims, 1 Drawing Figure

U.S.Patent May 16, 1978 4,089,563
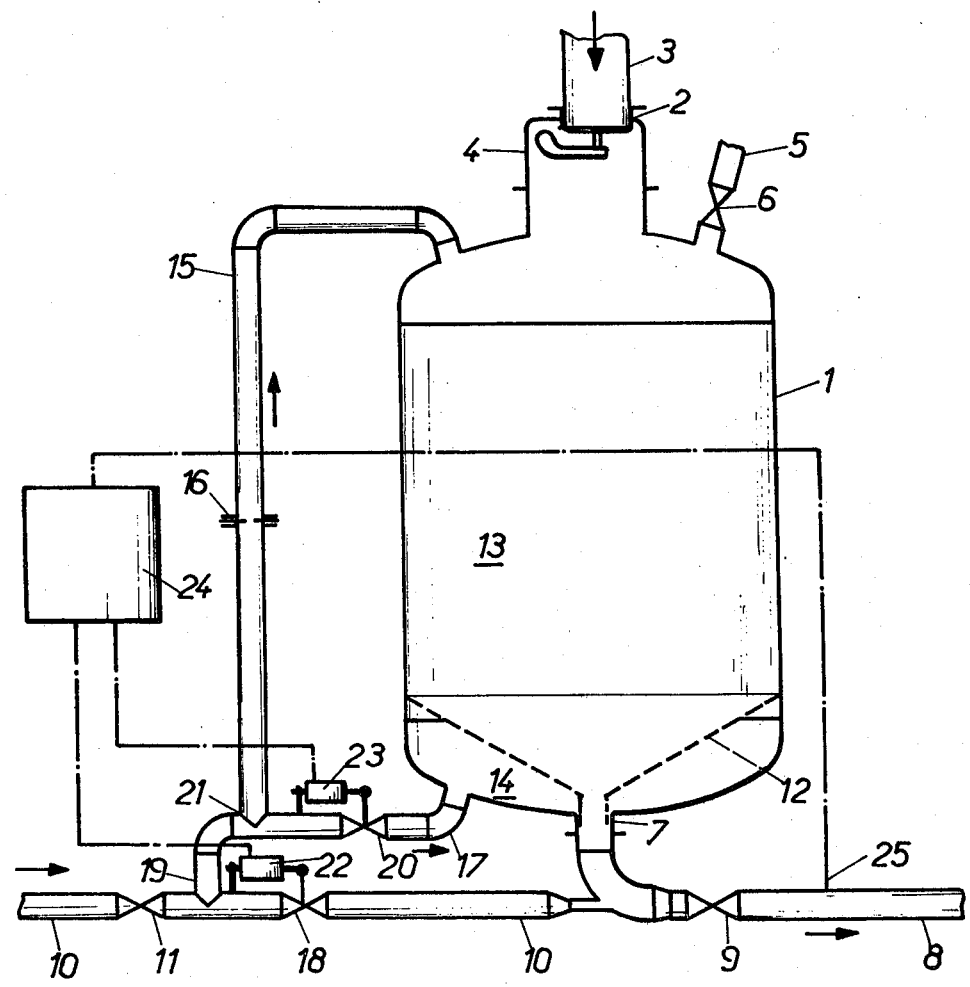

APPARATUS FOR PNEUMATIC CONVEYANCE OF PULVERULENT OR GRANULAR MATERIALS

The present invention relates to apparatus and method for the pneumatic conveyance of pulverulent or granular material in bulk form, and is applicable even to materials which may have poor flowability.

Apparatuses are known which are intended for the pneumatic conveying of granular or pulverulent materials and which comprise a generally cylindrical reservoir provided with a charging aperture at the top and with an outlet aperture at the bottom, the outlet aperture being connected to a pneumatic conveyor pipe to which leads a compressed air supply pipe; in the lower portion of the reservoir is installed a generally frustoconical porous wall which narrows towards the outlet aperture, to which it is sealingly connected, a fluidisation pipe connecting the chamber situated below the porous wall in the reservoir to the compressed air supply pipe.

According to this invention, apparatus as described has a valve, the control of which is modulated in dependence on the pressure prevailing in the conveyor pipe, provided on the fluidisation pipe. With such a valve it is possible to increase or decrease the flow of materials from the reservoir without any interruption of the conveying process and without acting on the air supply valve of the apparatus. This valve can remain open to the end of the operation, until the reservoir is completely emptied.

One embodiment of the invention will now be described by way of example with reference to the accompanying drawing, which is a diagrammatic view in section of an apparatus embodying the invention.

In the apparatus shown in the drawing there is a reservoir 1 provided at the top with a filing aperture 2, to which is sealingly connected a charging pipe 3 associated with a closure valve 4. Beside the filling pipe is a decompression pipe 5, which can be closed by means of a valve 6 during conveyance of material from the reservoir.

At its bottom, the reservoir 1 is provided with an outlet connection 7 connected to a pneumatic conveyor pipe 8 by way of a valve 9, which enables the reservoir to be placed under pressure before despatch of the material to be conveyed out of the reservoir. The pipe 10 supplying compressed air or other gas is connected into the conveyor pipe upstream of the valve 9 and is provided with an isolation valve 11.

In the reservoir 1, above the outlet connection 7, a frustoconical porous wall 12 is provided which tapers downwardly towards the connection 7, which opens through the wall 12. The wall 12 is sealingly connected to the connection 7. The wall 12 thus forms an upper chamber 13 and a lower chamber 14 in the reservoir 1.

Downstream of the isolation valve 11 the compressed air supply pipe 10 is connected by an equalising pipe 15 provided with a calibrated diaphragm 16 to the upper chamber 13, and by a fluidisation pipe 17 to the lower chamber 14.

The apparatus as so far described is in general terms known. Such apparatus can give excellent results with materials which flow readily.

To improve the use of the apparatus with materials which flow poorly and which have the risk of agglomerating and forming deposits in the pipes, a regulating valve 18 is provided in the compressed air supply pipe 10, downstream of the connection 19 to the fluidisation pipe 17, and another regulating valve 20 is provided in the fluidisation pipe 17, downstream of the junction 21 with the equalising pipe 15.

The valves 18 and 20 are operated by means of elements such as actuators 22 and 23 respectively, which are controlled by a regulator box 24 which is also connected to a pressure sensor 25 mounted on the conveyor pipe downstream of the cut-off valve 9.

The regulator box 24 controls the actuators 22, 23 in dependence on the pressure detected by the sensor 25 and on two predetermined thresholds, PB being the low pressure threshold and PH the high pressure threshold. The two pressure thresholds PB and PH are adjustable in dependence on the characteristics of the conveyor circuit. When the pressure detected by the sensor 25 is lower than PB, the valve 20 is progressively opened so as to increase the fluidisation of the material in the reservoir, thus assisting flow. When P is between PB and PH, the valve 20 remains unvaried. When the pressure P is higher than PH, the valve 20 is closed so as to reduce fluidisation of material and to restrict flow, and if the valve 20 is completely closed the valve 18, which normally is only partly open, is opened completely in order to direct more conveying air into the outlet pipe 8 and prevent or minimise the obstruction of the latter.

The normal degree of opening of the valve 18 is determined in dependence on the material to be conveyed and on the flow which is to be obtained. The flow in the equalising pipe 15 depends in known manner on the calibrated orifice 16.

With the knowledge of the mode of operation of the box 24, an expert will have no difficulty in designing its constructional details, and these details need not therefore be described here.

It is also possible to control the valve 18 in dependence on the pressure P, for instance by opening it if P becomes too high and closing it if P becomes too low.

By the invention it is possible to provide apparatus which make possible the conveyance of materials which flow with great difficulty, for example very fine powders of a grain size of a few microns, which tend to agglomerate. The conveyance may be effected with little or no product being retained in the reservoir.

I claim:

1. Apparatus for the pneumatic conveyance of pulverulent or granular material, having a reservoir for the material, a fluidisation barrier in the reservoir, an outlet for material flowing from above the barrier in the reservoir, an inlet conduit for fluidisation gas opening below the barrier, a conveyor conduit connected to the outlet, an inlet conduit for pressurized conveying gas opening into the conveyor conduit, a first valve in the inlet conduit for fluidisation gas, a second valve in the inlet conduit for conveying gas and control means for the said first and second valves arranged to control both the valves in dependence upon pressure in the conveyor conduit by increasing the rate of supply of gas for fluidisation when said pressure falls below a first predetermined value and decreasing the rate of supply of gas for fluidisation or stopping it altogether when said pressure rises above a second predetermined value, and when the supply of gas for fluidisation is stopped, increasing the rate of supply of gas for conveyance.

2. Apparatus according to claim 1 wherein the control means is arranged to open the first valve progressively when the pressure in the conveyor conduit falls below a predetermined lower threshold and to close it progressively when the said pressure exceeds a predetermined higher threshold, while retaining the first valve in substantially unvarying degree of opening when the said pressure is between said thresholds.

3. Apparatus according to claim 1 wherein the inlet conduit for conveying gas is connected to the conveyor conduit adjacent said outlet.

4. Apparatus according to claim 3 wherein said conveyor conduit has a bend adjacent said outlet and said inlet conduit for conveying gas is connected at the end of said bend remote from the outlet and upstream of a control valve in said conveyor conduit.

5. Apparatus according to claim 1 wherein an equalising conduit connects the reservoir above said barrier and said inlet conduit for fluidisation gas upstream of said first valve.

6. Apparatus according to claim 1 wherein the inlet conduit for fluidisation gas debouches from the inlet conduit for conveying gas upstream of said second valve.

7. A method for the pneumatic conveyance of pulverulent or granular material wherein said material to be conveyed is fluidised in a reservoir by means of a stream of gas which is introduced into the reservoir via a fluidisation barrier, and said fluidised material is conveyed from said reservoir through a conveyor conduit with the aid of a stream of gas injected into said conduit, and wherein the rates of supply of said gas streams for fluidisation and for conveyance are controlled in dependence on the pressure in the conduit by increasing the rate of supply of gas for fluidisation when said pressure falls below a first predetermined value and decreasing the rate of supply of gas for fluidisation or stopping it altogether when said pressure rises above a second predetermined value, and when the supply of gas for fluidisation is stopped, increasing the rate of supply of gas for conveyance.

* * * * *